United States Patent
Krohl

(10) Patent No.: US 10,215,492 B2
(45) Date of Patent: Feb. 26, 2019

(54) METHOD FOR PRODUCING SALTS WITH A REDUCED WATER OF CRYSTALLISATION CONTENT

(71) Applicant: ANDRITZ TECHNOLOGY AND ASSET MANAGEMENT GMBH, Graz (AT)

(72) Inventor: Paul Bernhard Krohl, Ravensburg (DE)

(73) Assignee: Andritz Technology and Asset Management GmbH, Graz (AT)

( * ) Notice: Subject to any disclaimer, the term of this patent is extended or adjusted under 35 U.S.C. 154(b) by 512 days.

(21) Appl. No.: 14/888,608

(22) PCT Filed: May 2, 2014

(86) PCT No.: PCT/EP2014/001177
§ 371 (c)(1),
(2) Date: Nov. 2, 2015

(87) PCT Pub. No.: WO2014/180547
PCT Pub. Date: Nov. 13, 2014

(65) Prior Publication Data
US 2016/0061522 A1 Mar. 3, 2016

(30) Foreign Application Priority Data
May 7, 2013 (AT) .................................. A 379/2013

(51) Int. Cl.
*F26B 3/00* (2006.01)
*F26B 21/06* (2006.01)
(Continued)

(52) U.S. Cl.
CPC ................ *F26B 21/06* (2013.01); *C01D 5/18* (2013.01); *C01G 49/14* (2013.01); *F26B 3/00* (2013.01);
(Continued)

(58) Field of Classification Search
CPC .. F26B 21/06; F26B 3/00; F26B 17/00; F26B 21/08; F26B 2200/00; C01G 49/14; C01D 5/18; C01P 2006/82
(Continued)

(56) References Cited

U.S. PATENT DOCUMENTS 2,631,084 A * 3/1953 Robinson ................ C01C 1/242
159/16.2
4,005,987 A * 2/1977 Jury .......................... C01D 5/18
159/4.04
(Continued)

FOREIGN PATENT DOCUMENTS

DE 1113666 9/1961
GB 388553 3/1933
(Continued)

OTHER PUBLICATIONS

International Search Report dated Sep. 15, 2014 (PCT/EP2014/001177).
(Continued)

Primary Examiner — Kenneth Rinehart
Assistant Examiner — Bao D Nguyen
(74) Attorney, Agent, or Firm — Alix, Yale & Ristas, LLP

(57) ABSTRACT

The invention relates to a method for drying salts with a water of crystallisation content in convective apparatuses that can additionally be indirectly heated. The invention is primarily characterised in that the drying process takes place with a moisture content of the drying gas above a determined level. The gas surrounding the salt particles during the drying process therefore has a specific humidity. In this way, the rate of drying is positively influenced.

19 Claims, 3 Drawing Sheets

Figure 1:
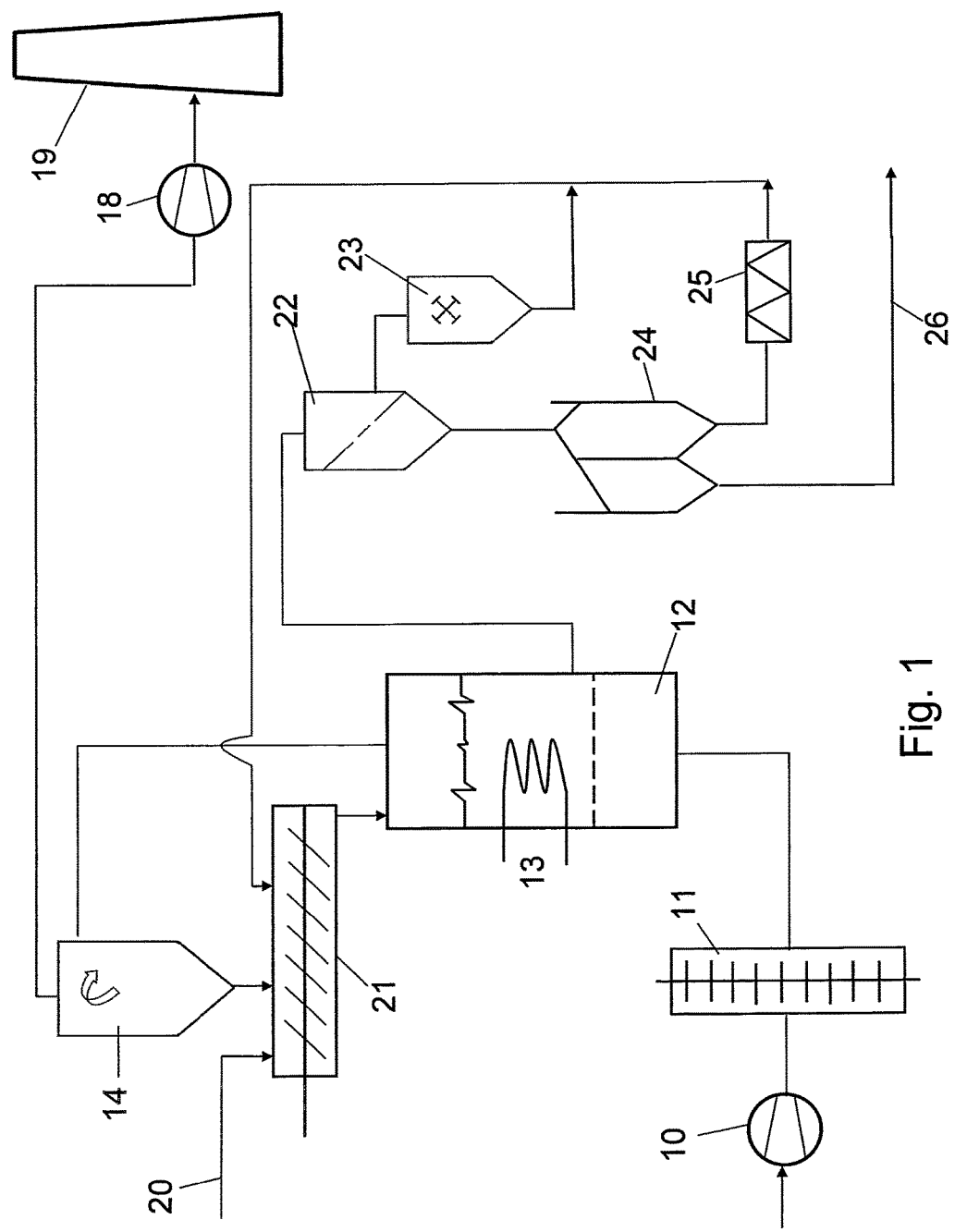

(51) Int. Cl.
     *C01D 5/18*          (2006.01)
     *F26B 17/00*        (2006.01)
     *F26B 21/08*        (2006.01)
     *C01G 49/14*       (2006.01)

(52) U.S. Cl.
     CPC .............. *F26B 17/00* (2013.01); *F26B 21/08* (2013.01); *C01P 2006/82* (2013.01); *F26B 2200/00* (2013.01)

(58) Field of Classification Search
     USPC .................................. 34/474, 446, 468, 557
     See application file for complete search history.

(56) References Cited

U.S. PATENT DOCUMENTS

| | | | | |
|---|---|---|---|---|
| 5,915,817 A | * | 6/1999 | Zagorzycki | ............... F26B 3/00 |
| | | | | 34/164 |
| 2007/0298993 A1 | * | 12/2007 | Pawar | .................... C11D 1/146 |
| | | | | 510/444 |

FOREIGN PATENT DOCUMENTS

| | | |
|---|---|---|
| GB | 805159 | 12/1958 |
| WO | 2005036080 A1 | 4/2005 |

OTHER PUBLICATIONS

International Preliminary Report on Patentability dated Apr. 21, 2015 (PCT/EP2014/001177).

\* cited by examiner

METHOD FOR PRODUCING SALTS WITH A REDUCED WATER OF CRYSTALLISATION CONTENT

The invention relates to a method for drying salts containing water of crystallisation in convective devices.

Many salts form hydrate stages during crystallisation. The embedded water of crystallisation is often undesirable because it increases the transport costs, reduces the concentration and in some cases results in a product that is not stable when stored. The extent of the hydrate stage, i.e. the number of embedded water molecules, can be controlled favourably by means of the crystallisation conditions in some cases, but in many cases there is no way round thermal dewatering. The more water molecules embedded per salt molecule, the easier it is for the water molecules last embedded to detach themselves again, i.e. both the energy required to overcome the bonding energy and the temperature required for detachment increase as the number of water molecules already separated per salt molecule rises. Products with a high water content, such as Glauber salt (magnesium sulphate*10 water), already gives off water of crystallisation at a slightly higher room temperature and liquefies (become a solution). This behaviour is the reason for the different product qualities obtained after any thermal drying.

In technical practice, dusty and fine-grain products that are susceptible to abrasion or stable granulates with low dust content and intermediate or transitions stages of both products are obtained, depending on the drying process and the operating and design conditions selected. Drying is conducted typically in rotary dryers (drum dryers), flash tube dryers or fluidized bed dryers with or without built-in heat exchangers. Spray granulation in the fluidized bed is also used, but is less economical due to the increased water evaporation. In some cases, the drying methods are also combined with one another.

What all methods have in common is that the product quality differs and cannot be determined in advance. Many methods provide a dusty product that is susceptible to abrasion and which has a low bulk density of 800-1000 g/l, and others provide a firm granulate of 1200 g/l and more (e.g. spray granulation, fluidized bed dryers with built-in heat exchangers).

The aim of the invention is thus to produce salts with a reduced water of crystallisation content that have certain defined properties regardless of the method used, where the properties depend to a large extent on the bulk density.

The invention is thus characterised in that drying takes place above a certain defined moisture content, for example an absolute moisture content of 10%, in the drying gas. The gas that surrounds the salt particles during drying thus has a certain moisture content. This has an effect on the drying speed. At high speeds, the water evaporates spontaneously first of all on the surface, and then more water of crystallisation is released inside the particle, evaporated and brought to the surface through pores and capillaries as a result of the rising temperature. The capillaries and pores are expanded as a result of the high mass flows, and a porous particle with low density and a weakened structure is created. At low drying speeds, the water of crystallisation that has separated remains in a liquid state for a longer period, and the saline solution partially formed can again close or reduce the size of some pores, cracks and capillaries. This results in a firm particle of high density.

An advantageous development of the invention is characterised in that the moisture content of the drying gas is set above the defined moisture value by the evaporated water alone, where the moisture content in the drying gas can be set by adapting the water evaporation rate with the aid of the drying gas temperature or, as an alternative, by means of additional heat exchanger surfaces.

An alternative embodiment of the invention is characterised in that the moisture content of the drying gas is set by recirculating some of the gas, where the moisture content of the drying gas can also be set above the defined moisture value by fully recirculating the gas, and the evaporated water here is discharged from the loop by means of condensation and the moisture content of the drying gas is set with the aid of the condenser temperature.

In particular, salts with a high water of crystallisation content, e.g. decahydrates or Glauber salt (sodium sulphate), already release water of crystallisation at low temperatures (well below 100°). As a result of the low temperatures, there is not enough evaporation and the salt liquefies or cakes.

A favourable development of the invention is thus characterised in that the dust and/or dried product is combined and, if necessary, mixed with the damp salt containing water of crystallisation before drying. The excess free water of crystallisation can be bound by means of recombination to obtain a non-critical mixture that can be dried further. This recirculation takes place typically in a mixer that precedes the dryer, but can also be performed in the dryer if it has the appropriate dryer geometry.

An advantageous development of the invention is characterised in that, instead of dust and/or dried product, oversized granules ground to dust are combined with the moist salt containing water of crystallisation ("coating with powder").

A favourable development of the invention is characterised in that the moisture content can only be set in a partial geometrical area of the dryer, e.g. in the feed zone.

When drying iron sulphate heptahydrate (ferrous sulphate) to a monohydrate using the method according to the invention, it has proved an advantage to set the absolute moisture content in the drying gas to more than 15% when it leaves the dryer in order to obtain a product with a bulk density of more than 1100 g/l.

According to the theory of the method proposed, there are several possible ways of setting the advantageous conditions. In the drying units used, the gas carries off the evaporated water, and the energy can also be supplied via the gas and/or through contact surfaces.

In purely convective devices, the moisture content in the waste gas is generally too low, and the hot gas temperature and flow rate must, therefore, be selected with the aid of the energy balance such that the water thus evaporated raises the moisture content in the waste gas to the desired level. This does not necessarily succeed with all types of salts and dryers. There are limits when increasing the temperature (damage to product, material strength, energy sources available, . . . ), and any increase in the volume flow does feed more energy to the device, but it does not alter the status of the waste gas in the desired direction.

Convective devices with indirect heating can set the water evaporation rate independently of the volume flow, using the temperature of the heating surfaces on the one hand and the size of these surfaces on the other hand. For a fluidized bed dryer with built-in heat exchangers, for example, this means increasing the transfer surface area by increasing the packing density ($m^2$ of heat exchanging surface area/$m^3$ layer volume) or increasing the layer depth at unchanged packing density if the capacity to increase the temperature has already been exhausted. As a result, water evaporation and moisture content in the waste gas are raised as required at unchanged inflow.

Furthermore, it is possible to set the waste gas to any desired status by recirculating some or all of the waste gas. If it is partially recirculated, some of the moist gas is discharged and the rest is recirculated. The ratio of the gas flows determines the waste gas moisture content and all of the evaporated water is discharged with the partial flow.

In the event of full recirculation in a closed gas loop, the evaporated water is condensed in a condenser and discharged from the loop. The temperature of the condenser determines the moisture content in the waste gas.

Embodiment example 1: Iron sulphate heptahydrate with surface moisture is dried to a monohydrate in a fluidised bed dryer with a built-in heat exchanger in the product layer. 420 kg/h of moist heptahydrate and 260 kg/h of dried recirculated material (monohydrate product and dust from the drying plant) were fed to the dryer via a mixer. The drying air (1300 kg/h) had a temperature of 185° C., the heat exchanger 195° and the product layer 117° C., Together with the initial loading of 10 g/kg dry air, this resulted in an exhaust air load of 146 g/kg dry air, corresponding to an absolute moisture content of 12.7% and a dew point of approximately 63° C., due to the evaporated water. The result of this drying process at low moisture content was a light, dusty monohydrate granulate with a bulk density of 710 g/l, average grain diameter of 250 microns, and dust discharge of 66% in the exhaust air during drying.

Embodiment example 2: In the same dryer, a mixture with the same amounts of heptahydrate and recirculated material comprising monohydrate and dust from the drying process was dried at virtually the same temperatures (air 178°, heat exchanger 195°, product layer 120°). The main difference compared to example 1 was that the air was fully recirculated and the evaporated water fully condensed in a washer. Due to the changing product, the amount of air conveyed through the loop had to be increased to 1730 kg/h. The washer had a temperature of 65°, which resulted in a total load of 205 g water/kg dry air, in the air recirculated to the dryer. Together with the evaporated water, the exhaust air then contained 329 g/kg after the dryer, equivalent to an absolute moisture content of 24.8% and a dew point of approximately 73°. As a result of this humid atmosphere during drying, the monohydrate produced was stable and heavy, with a bulk density of 1195 g/l, an average grain diameter of 450 microns and dust discharge with the exhaust air of only 15%.

In the following figures, the variants of the method are described using a fluidized bed dryer as an example. These figures also apply by analogy to the other types of dryer mentioned above.

Figure 2:
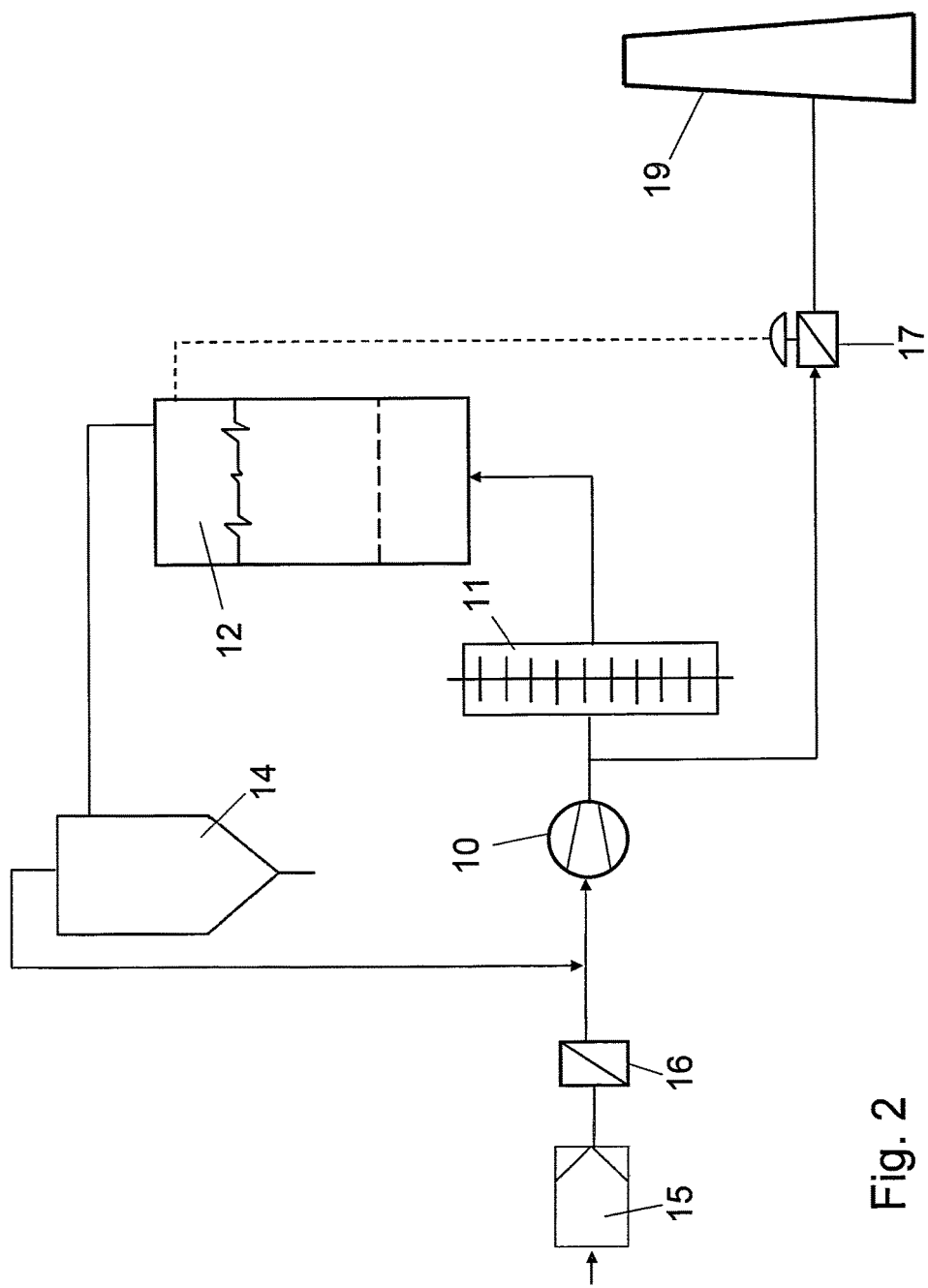
Figure 3:
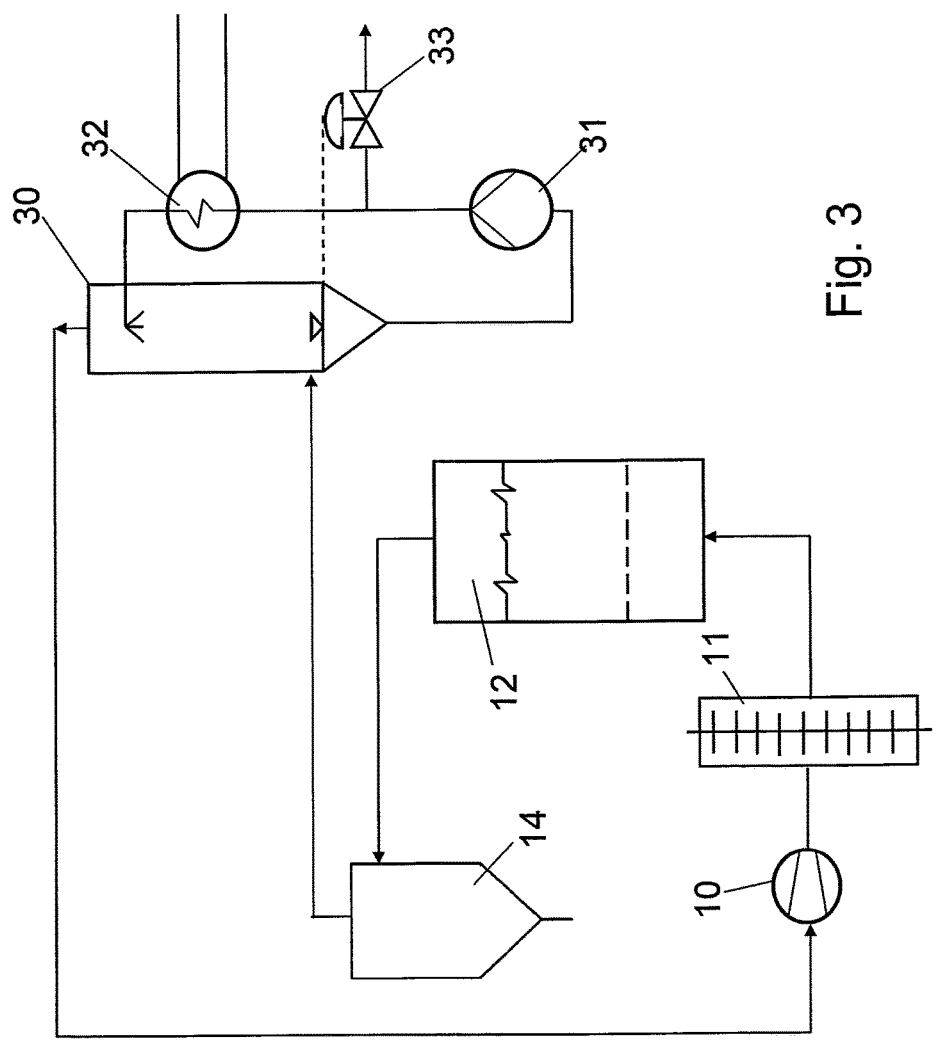

FIG. 1 shows a system according to the invention with a flow of recirculated material, FIG. 2 shows a system according to the invention with partial gas recirculation, and FIG. 3 shows a system according to the invention with full gas recirculation.

The supply air fan 10 (see FIG. 1) pushes ambient air through a heater battery 11 into the drying device (in this case a fluidized bed dryer) 12, in which the salt can be heated optionally by the heat exchanger 13, and releases the water of crystallisation. The moist drying gas leaves the dryer, the dust is removed from the gas in a filter or cyclone 14, then the drying gas passes through the exhaust air fan 18 into the fresh air 19 after undergoing optional, additional gas cleaning. The salt 20 with a moist surface and containing water of crystallisation is coated with the dust separated in the cyclone or filter 14 and optionally with recirculated product in the mixer 21 and fed to the dryer 12. After the drying process, the salt leaves the dryer 12 and the oversized grains are removed on an optional screen 22, ground 23 and fed to the mixer 21. The accept fraction enters an overflow silo 24, from which recirculated product for the mixer 21 is taken optionally by a dosing screw 25 and to which the final product 26 is fed for further processing.

FIG. 2 shows the variant of the drying process with partial gas recirculation in order to set a defined gas moisture content, i.e. a defined moisture content in the dryer. The product is treated in the same way as described in FIG. 1, but is not shown here for the sake of maintaining clarity. The fan 10 presses the gas in the circulating system through the heater battery 11, dryer 12 and dust remover 14. A partial flow of fresh air, which is cleaned with the optional filter 15, is added in metered doses with the aid of the throttling device 16. In this way, the moisture content of the gas is set in the dryer 12. The corresponding amount of moist waste gas is discharged through the pressure-controlled throttling device 17 on the discharge side of the fan. This flow of waste gas 19 also contains the evaporated water from the product. The smaller the partial flow of fresh air, the higher the moisture content in the gas.

If the circulating system is completely closed (see FIG. 3), the evaporated water must be removed selectively from the circulating gas. This can usefully be achieved by condensation in a surface or a wash condenser 30. The wash water is pumped 31 through the circulating system and the condensation heat is removed via the cooler 32. The volume of condensed water, which also corresponds to the volume of water that has evaporated from the product, is removed from the process with level control 33. With the aid of the cooler 32, the temperature of the wash water can be set such that the initial moisture content needed in the circulating gas results from the partial steam pressure of the water. The initial moisture content is calculated from the desired moisture content in the waste gas less the proportion generated by water evaporation from the product. The circulating gas is conveyed in a loop by the fan 10 through the heater battery 11, the dryer 12, the dust separator 14, and the washing condenser 30. The product route is the same as is shown in FIG. 1, but is not repeated here for the sake of maintaining clarity.

The systems shown are only intended as examples and are illustrated using a fluidized bed dryer (with or without built-in heat exchanger) as an example. However, rotary dryers (drum dryers), flash tube dryers or fluidized bed spray granulators could also be used.

The invention claimed is:

1. A method for drying moist salts containing water of crystallisation, comprising:

drying the moist salts with a hot drying gas having a moisture content and temperature in a convective dryer whereby water is evaporated from the moist salts as the moist salts are dried and said evaporated water increases the moisture content of the drying gas in the dryer; and maintaining the absolute moisture content of the drying gas in the dryer above a predefined moisture content value, using only water evaporated from said moist salts, wherein the moisture content in the drying gas in the dryer is maintained above said predefined moisture content value, in dependence on sensing the water evaporation rate from said moist salts and the temperature of the drying gas.

2. The method according to claim 1, wherein the moisture content in the drying gas in the dryer is maintained above said predefined moisture content value, in dependence on additional heat supplied to the dryer through heat exchanger surfaces.

3. The method according to claim 2, wherein
a supply of moist salt containing water of crystallisation is fed to a device upstream of the dryer;
salt dust and dried salt product are removed from the dryer as discharged material; and
at least some of said discharged material is combined with said moist salt in said device and the resulting combination is fed to said dryer.

4. The method according to claim 2, wherein said absolute moisture content is at least 10%.

5. The method according to claim 1, wherein
a supply of moist salt containing water of crystallisation is fed to a device upstream of the dryer;
salt dust and dried salt product are removed from the dryer as discharged material; and
at least some of said discharged material is combined with said moist salt in said device and the resulting combination is fed to said dryer.

6. The method according to claim 5, wherein said discharged material includes oversize granules larger than a maximum size, and the method includes,
grinding said oversize granules;
combining the ground granules with said moist salt in said device; and
feeding the combination to said dryer.

7. The method of claim 5, wherein said combining is in a mixing device.

8. The method according to claim 5, wherein said absolute moisture content is at least 10%.

9. The method according to claim 1, wherein the dryer has a plurality of regions and the moisture content value is set in only one of said regions.

10. The method of claim 9, wherein the dryer includes a feed region and the moisture content value is set in the feed region.

11. The method according to claim 1, wherein said absolute moisture content is at least 10%.

12. The method according to claim 11, wherein said moist salts are dried to a monohydrate product having a bulk density of more than 1100 g/l.

13. The method of claim 1, wherein
a supply of moist salt containing water of crystallisation is fed to a device upstream of the dryer;
salt dust and dried salt product are removed from the dryer as discharged material; and
at least some of said discharged material is combined with said moist salt in said device and the resulting combination is fed to said dryer.

14. The method according to claim 1, wherein said absolute moisture content is at least 10%.

15. The method according to claim 1, wherein
the moist salts containing water of crystallisation is iron sulphate heptahydrate;
said moist salts are dried to a monohydrate product having a bulk density of more than 1100 g/l;
the moisture of the drying gas increases as the drying gas passes through the dryer until it is discharged; and
the absolute moisture content of the drying gas is greater than 15% when it is discharged from the dryer.

16. The method according to claim 15, wherein
a supply of moist iron sulphate heptahydrate salt containing water of crystallisation is fed to a device upstream of the dryer;
salt dust and dried salt product are removed from the dryer as discharged material; and
at least some of said discharged material is combined with said moist salt in said device and the resulting combination is fed to said dryer.

17. The method according to claim 1, wherein said moist salts are dried to a monohydrate product having a bulk density of more than 1100 g/l.

18. The method according to claim 17, wherein
the moisture of the drying gas increases as the drying gas passes through the dryer until it is discharged; and
the absolute moisture content of the drying gas is greater than 15% when it is discharged from the dryer.

19. The method according to claim 1, wherein
the moisture of the drying gas increases as the drying gas passes through the dryer until it is discharged; and
the absolute moisture content of the drying gas is greater than 15% when it is discharged from the dryer.

* * * * *